United States Patent Office 3,660,442
Patented May 2, 1972

3,660,442
ORGANOTIN MERCAPTOACID ESTERS AND THEIR METHOD OF PREPARATION
Jerome H. Ludwig, Shaker Heights, Ohio, assignor to Synthetic Products Company, Cleveland, Ohio
No Drawing. Filed Sept. 11, 1970, Ser. No. 71,353
Int. Cl. C07f 7/22
U.S. Cl. 260—429.7        14 Claims

ABSTRACT OF THE DISCLOSURE

Pure or substantially pure condensation products of diorganotin bis (thioglycollate esters) which may be represented by the formula:

$$R_2Sn(SCH_2COO \cdot R')_2$$

wherein R and R' are monovalent hydrocarbon radicals. These condensation products are characterized by their freedom or substantial freedom from undesired organotin mercaptoacetates and other esters or alcohols.

A method of preparing organotin mercaptoacid esters by continuously passing a reaction mixture of a mercaptocarboxylic acid ester and organotin compound through a heat exchange zone and continuously withdrawing the desired condensation product from the zone. The method disclosed also provides for removal of by-product water.

BACKGROUND OF THE INVENTION

Condensation products of mercaptocarboxylic acid esters and organotin halides or oxides have been described in United States Pats. 2,641,588; 2,641,596 and 2,648,590. These condensation products are produced batch-wise by reacting a mixture of mercaptocarboxylic acid ester and an organotin compound either in mass or in the presence of inert solvent media. In either the mass or solvent media reaction, the components are charged into a reaction vessel of suitable size for containment during a batch reaction over a period of time ranging from about one to about several hours depending upon the nature of the reactants. The batch reaction is usually conducted by subjecting the reactants to heat and, because of by-product water produced by the condensation reaction, it usually requires additional heating, azeotropic distillation or vacuum distillation in order to strip the water from the desired condensation product. Such prolonged temperature treatment also generates undesired side-reaction products and promotes impurity formation in the desired condensation product. In the solvent media reaction, a solvent such as benzene or toluene is normally selected to enable the removal of water by azeotropic distillation from the reacting mass contents, after which the condensation product of the batch reaction is isolated. Such azeotropic distillation requires explosion-proof equipment and maximum safety precautions for commercial operations.

As reported in the mentioned patents, the condensation products were found to be useful as stabilizers for vinyl chloride resin compositions. However, difficulty was encountered in the storage of the condensation product and subsequent use. In U.S. Pat. 2,789,963 issued to Hecker, one of the discoverers of the condensation products described in the earlier mentioned patents, it was reported that they were unstable. For example, a condensation product purportedly containing a dibutyltin dicyclohexylthioglycollate appears to be a homogeneous liquid product when first produced by the mentioned batch reaction technique. Upon cooling and standing, however, even in a period of a day or so, crystals separate. The crystalline fractions of these types of liquid condensation products were reportedly isolated and tested separately as a stabilizer for polyvinyl chloride resin according to the just mentioned Hecker patent. The crystalline material proved to be ineffective as a stabilizer and, moreover, the liquid product remaining behind, after the removal of the crystals, was reported to be less effective per unit of weight than the original whole condensation product. Hecker postulated that the crystalline product was an organotin mercapto compound, i.e., dibutyltin thioglycollate, of a cyclic nature, having the formula:

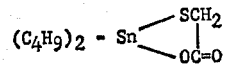

This product was also prepared independently by Hecker and found to be crystalline.

In addition to this impurity of organotin mercapto compound, other by-products and unreacted mercaptocarboxylic acid esters may be present in the condensation product as outlined in the following equations.

Desired reaction:

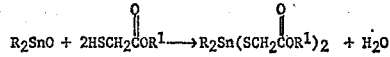

Side Reaction:

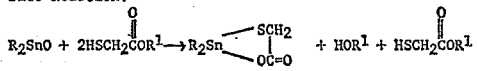

According to the side reaction equation, in addition to the organotin impurity, by-product alcohols, i.e., $R^1OH$ are formed and unreacted mercaptoacid esters, i.e.

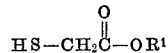

remain. These alcohols and unreacted mercaptoacid esters contribute odor and unwanted flammability to the desired reaction product. The flash points of known batch reaction products are indicative of by-product alcohols, unreacted mercaptoacid esters and azeotropic solvents being present in the desired condensation reaction product. Their presence causes the desired condensation products to have low flash points which present a serious problem in the maintenance of fire and safety regulations when the condensation products are put to use, for example, in the stabilization of thermoplastic resins which are being compounded, molded and worked under elevated temperatures.

Whatever the theory advanced for the so-called instability of the condensation products produced by the prior art processes, in substance, empirically it has been recognized that these known processes inherently produce a mixture of by-products and unreacted starting materials. Some products of this type lack storage stability, are heterogeneous and have been claimed to lose their vinyl halide resin stabilizing effectiveness upon standing. Heterogeneity not only increases the problems of measuring and mixing the condensation products into vinyl halide resins for stabilization, but practically speaking, heterogeneity causes a dissolute appearance which reduces commercial marketability of the condensation products.

It has been heretofore proposed in U.S. 2,789,963 to alleviate these problems of product storage instability and product heterogeneity of the batch reaction by introducing preservatives into the freshly prepared organotin mercaptoacid ester. These proposed preservatives are salts of bivalent or other multivalent metals and weak carboxylic acids which reportedly restrict the separation of products of the condensation reaction to light sludges.

These salt preservatives have been known in themselves to act as stabilizers for polyvinyl halide resins. Thus, one approach of the prior art has heretofore been to "stabilize the stabilizers" by introducing an additional stabilizing material into the condensation products produced by the batch reaction of organotin compounds and mercaptocarboxylic acid esters. Other prior art approaches involve the use of solvents such as epoxidized soy bean oil, thioglycollate esters and alcohols to reduce heterogeneity, but these solvents dilute stabilizer effectiveness. Also, as discussed above, these alcohol and ester solvents give rise to odor and further limit the utility of desired condensation products because of their even lower flash points due to the presence of these solvents.

SUMMARY OF THE INVENTION

In summary, this invention is directed to a more satisfactory solution to the above discussed problems associated with the production and utilization of condensation products or organotin oxides and mercaptocarboxylic acid esters. This invention has as one of its principal objectives the preparation of high purity condensation products which consist essentially of the desired condensation product without undesired by-products and unreacted mercaptocarboxylic acid esters which are inherent in known condensation products produced according to the prior art batch techniques. For example, high purity condensation products have been produced according to this invention which have substantially higher flash points in comparison to flash points of products produced by known batch techniques. These high purity condensation products have also demonstrated other valuable properties. In another of its main aspects, this invention provides for an improved method for the production of organotin mercaptoacid esters.

This invention is predicated in part upon the discovery that condensation products of mercaptocarboxylic acid esters and diorganotin oxides can be produced in an expedient manner by a method which lends itself to continuous commercial production. Products have been produced according to this invention which possess virtually complete storage stability without the necessity for incorporating additional stabilizers or preservatives as heretofore proposed or known in the prior art. Surprisingly, it has been found that a condensation product of diorganotin bis(thioglycollate ester) which may be represented by the formula:

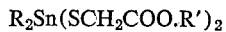

wherein R and R' represent monovalent hydrocarbon groups or radicals can be produced either free or substantially free from undesired organotin mercaptoacetate impurities, other side reaction products and unreacted mercaptoacetate esters which diminish the stabilizing utility of the desired condensation product. The pure condensation products of this invention have been unobtainable according to known batch techniques. The undesired organotin mercaptoacetate impurities of the type proposed by the formula:

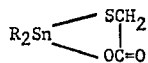

have been found to be eliminated entirely or reduced to such extremely low levels in the novel products of this invention that for practical purposes their presence is inconsequential as determined by both product storage stability tests and/or by spectral analysis. For example, quantitative spectral analyses for the undesired organotin mercaptoacetate impurity in the condensation products of this invention, for example, the dibutyltin bis(isooctylthioglycollate), has been quantitated well below the saturation point of 0.18% by weight impurity in the desired product. (See Example 1 following where the impurity was quantitated at about 0.058% by weight.) In fact, storage stability tests for this condensation product have shown ordinary room temperature storage stability of a year and one half or more without the development of any crystals or solids of any kind in the liquid product. In contrast (see Example 2 following) the condensation product produced from the same reactants employing batch techniques of the prior art have been shown by analysis to yield a mixture of products as confirmed by U.S. 2,789,963 from which the undesired organotin mercaptoacetate impurity will crystallize almost immediately, or within a period of a day or so, in substantial amounts to diminish the stabilizing efficiency of the desired product as heretofore discussed. Also, such poor storage stability causes problems in the commercial use and marketability of the condensation product. For example, bulk storage containers accumulate solid and require periodic cleaning. Transfer lines, valves, spray nozzles, etc., are plugged by solids and required cleaning thereby causing downtime in fields such as PVC compounding.

In addition to the virtually unlimited shelf life of the condensation products produced according to the method of this invention, they have been found to exhibit lower odor which is normally associated with unreacted mercaptoacid esters present in products produced according to the prior art techniques. The approach of the industry heretofore has been to mask these undesirable odors with additives which reduce them to levels which are tolerated by personnel who use the condensation products. This invention eliminates the need to mask such deleterious odors.

Importantly, from the standpoint of fire and safety regulations, condensation products of this invention have flash points of about 50–75° F. higher than condensation products produced according to known batch techniques. Such higher flash points are indicative of the lack of volatilizable alcohol, ester impurities, residual azeotropic solvents and the like in the desired condensation product. The flash point is the temperature at which a flash of flame is first observed when a small lighted flame is passed over a sample of a flammable substance in a cup (According to ASTM Standard Method of Test D92–66 by Cleveland Open Cup). Condensation products having higher flash points enhance their utility in such fields as vinyl halide resin compounding where resin containing the products as stabilizers becomes subjected to flame and temperature treatment which normally would create more hazardous conditions with conventional products having lower flash points.

It has further been found according to the method of this invention that the reaction of dialkyltin oxides and mercaptoacid esters can be quantitative with removal of by-product water in a very short period of time on a continuous basis to produce the desired derivatives. This method is readily adaptable for commercial use without the hazards associated with distillation techniques of volatile solvents discussed above in the background of this invention. The unique advantages of this method are further demonstrated by the fact that organotin di(ethylthioglycollate) and like derivatives where the R' in the formula $R_2Sn(SCH_2COO.R')_2$ defined above is an ethyl group or similar lower carbon containing group, can be prepared in a relatively pure state of about 98% by weight purity. In contrast, prior art batch techniques have proved totally unsatisfactory for preparing these type derivatives. See, for example, Example 9 hereinafter. Using known batch techniques, reaction products are obtained which are almost entirely crystalline and which predominantly contain organotin mercaptoacetate impurities.

More particularly, the method of this invention for producing organotin mercaptoacid esters includes the provision of a heat exchange zone having a reaction mixture inlet and a product outlet. This zone is provided, for example, by a tubular heat exchange apparatus. A reaction mixture of (1) diorganotin oxide represented by the formula $R_2SnO$ such as dibutyltin oxide, and (2) a mercaptoacid ester represented by the formula $$HSCH_2COO.R'$$

such as iso-octylthioglycollate is continuously passed through the zone and the desired condensation product represented by the formula $R_2Sn(SCH_2COO.R')_2$ is continuously withdrawn from the zone. The R radicals in the just mentioned formulas are exemplified by alkyls such as butyl, octyl, isooctyl and dodecyl; aryls such as phenyl, tolyl or xylyl. Compounds having R radicals containing about four to about eight carbon atoms have been produced which possess an unexpectedly high purity, stability and flammability resistance. R' radicals are exemplified by alkyl such as ethyl, butyl, octyl, iso-octyl, dodecyl, and cyclohexyl; aryls such as phenyl and benzyl. R' radicals containing about two to about twenty-two carbon atoms are preferred.

In this method of production, it has been found that the time-temperature treatment of the reaction mixture in the heat exchange zone through which the reaction mixture is passed can be controlled so that the rate of passage at the zone temperature produces the desired product substantially free of undesirable impurities. The exact reasoning for this is not completely understood. However, it is hypothesized that in the batch techniques where the reaction mixture is contained throughout the condensation reaction, apparently the side reactions are favored. It is also hypothesized here that the desired condensation product of the batch reaction, when subjected to the prolonged heat-treatment characteristic of the batch reaction to obtain good yields and to remove by-product water, starts to degrade at the later stages of the reaction.

Whatever the reason or theory for the success of applicant's method here, empirically it has been determined in one of its broader aspects, the continuous passage of the reaction mixture through a heat exchange zone such as a heated reactor will permit the controlled production of the desired condensation product free or substantially free of undesired by-products and unreacted components.

In a preferred embodiment, the method is adapted for continuous production of pure condensation products by introducing the reaction mixture into one end of a heated tubular reactor and continuously withdrawing the desired condensation product from the opposite end of the reactor. Also, by-product water is removed from the desired condensation product. In this preferred embodiment, the reaction mixture is continuously fed into an inlet end of a heated tubular chamber which provides the heat exchange zone. Desired product exits from the outlet end of the chamber. In one form, and on a laboratory scale, the tubular chamber comprises an electrically heated glass tube which is situated at an angle and is open at both ends to the atmosphere. The upper (reaction mixture) inlet end of the chamber is elevated relative to the outlet (product) end to control flow rates of the reaction mixture through the chamber. The open ends permit vaporization and removal of by-product water. In one preferred technique, the by-product water is removed as vapor prior to collecting the desired product. This affords the advantage of eliminating an after-treatment of the product to remove the water from the desired reaction product as, for example, by azeotropic dehydration techniques. In another form of the method, commercial tubular reactors, heat exchangers, spraying columns and the like, can be used to provide the heat exchange zone. These commercial tubular devices are conventional and comprise basically a tubular reaction chamber which may have an internal rotor blade to assist in processing and controlling flow rates of reactants therethrough. A typical commercial device is a Reverse Taper Thin-Film Processor made by the Kontro Company, Inc. (described in more detail in the examples) which has a reaction mixture inlet port, (product) outlet port, and water condensation and vapor ports for removal of water. The exact construction of the reaction chamber or heat exchange zone forms no part of this invention, it being understood in view of the examples, that various pieces of equipment can be employed to perform the method of this invention. The heat exchange zone or chamber is heated or maintained for example, at temperatures on the order of about 75°–160° C. and usually within the range of about 120°–160° C. depending upon the nature of the reaction mixture, the application of vacuum, quantities of ingredients within the reaction mixture, the flow rates of the mixture through the heat exchange zone and the desirability of the eliminating by-product water by vaporization. It is to be understood by those of ordinary skill that some reactions of organotin oxide and mercaptoacid ester are exothermic and this is to be taken into consideration in maintaining the temperature control in the heat exchange zone through which reaction mixture is passed as will be further appreciated by the following examples to obtain the advantages of this invention. The organotin compound and mercaptoacid esters making up the reactants are mixed in approximately stoichiometric amounts in accord with chemical equations advanced for the reaction as defined above. The reactants can be pre-mixed under ambient room temperature conditions in stirred feed tanks prior to their introduction into the heat exchange zone and at present this is the preferred mode of introduction. This doesn't preclude their controlled separate addition to the zone. When such pre-mixture of reactants in feed tanks causes an initial reaction to occur this does not adversely affect the results of this invention because it has been found that the critical phase of the reaction is in the later stage of conversion to the desired condensation product. Apparently, the side reaction becomes more dominant in the later stages of conversion and by-products or undesired impurities form in the latter stages of the reaction. It has been found that the continuous process treatment according to this invention will eliminate later stage impurities formation. Flow rates of the reacting mixture can vary over a wide range, in accord with the operating parameters of the examples hereinafter described, depending upon the size of the equipment and quantities of charged materials.

The invention, its operating parameters and further details will be better understood at this point by reference to the examples which illustrate its practice. In the examples, analytical techniques are referred to which were employed in ascertaining the level of organotin mercaptoacetate impurity in admixture with the desired condensation product. The techniques employed were (A) conventional capillary film infrared analysis and (B) quantitative infrared analysis which were performed as follows. Flash points, where determined, were made by ASTM Standard Method D92–66 and this method is incorporated herein by this reference. Percents (%) where not otherwise indicated are by weight.

(A) Conventional capillary film infrared analysis

One drop of the organotin mercaptoacid ester condensation product was placed on one side of a sodium chloride infrared cell crystal. A second sodium chloride infrared cell crystal was placed on top of the sample and pressed down gently until a continuous capillary film of sample was present between the two sodium chloride infrared cell crystals. The crystals were then mounted in a holder and secured by tightening the screw clamps with the fingers. The infrared spectrum was then determined on a Perkin-Elmer Model 337 Grating Infrared Spectrophotometer.

Estimates of organotin mercaptoacetate impurity in the sample were made by comparison to reference spectra containing known amounts of the impurity in the presence of the desired condensation product. Organotin mercaptoacetate impurity used in obtaining reference spectra was isolated or prepared in accord with Examples 10 and 11 which follow.

(B) Quantitative infrared analysis

Solutions of organotin mercaptoacetate impurity are first prepared in 1,2 - dichloroethane (spectral grade). In the following examples, only two impurities require consideration here, e.g., dibutyltin mercaptoacetate and di-octyltin mercaptoacetate and, accordingly, this description of quantitative infrared analysis will be concerned with these two, it being understood that a similar determination can be made for other types of organotin mercaptoacetate impurities. Concentrations of 0.000, 0.020 g./10 ml. and 0.040 g./10 ml. were employed which would represent 0%, 2% and 4% of dibutyl or dioctyl impurity based on a 1.000 g./10 ml. sample of the desired condensation product, e.g., dialkyltin S,S'-bis(alkylthioglycollate) in 1,2-dichloroethane. The 5 to 7 micron infrared spectrum for each solution was determined on a Perkin-Elmer Model 337 Grating Infrared Spectrophotometer. A fixed cell of 0.096 mm. was employed for the solution and a solvent reference cell for solvent compensation. Operating parameters were (1) slow scan speed and (2) normal slit width.

The absorbance of the dibutyl or dioctyl impurity at about 6.4 microns for these samples was measured directly from the spectra by the base-line technique. These values are reported in Table I as follows with the dibutyl impurity under column A and the dioctyl impurity under column B.

TABLE I

Determination of Linear Relationship of Concentration/Absorbance for Dialkyltin Mercaptoacetate Impurities

| Sample | Concentration | Absorbance A (Dioctyl) | B (Dibutyl) |
|---|---|---|---|
| 1 | 0.000 g./10 ml | 0.002 | 0.003 |
| 2 | 0.020 g./10 ml | 0.075 | 0.054 |
| 3 | 0.040 g./10 ml | 0.153 | 0.098 |

It was assumed that the absorbance of the standards at these low concentrations is linear with concentration and the method of least squares was employed to define this linear relationship. For the dibutyl impurity, the empirical formula to determine the percent impurity in dibutyltin S,S'-bis(alkylthioglycollates) would be:

Percent impurity $(C_4)_2$ $$= \frac{\text{Absorbance (at 6.4 microns)} - 0.0012}{0.03775}$$

For the dioctyl S,S'-bis(alkylthioglycollates), the dioctyl impurity may be determined by the formula:

Percent impurity $(C_8)_2$ $$= \frac{\text{Absorbance (at 6.4 microns)} - 0.0052}{0.02375}$$

These formulas are based upon a 1.000 g. sample of dialkyltin S,S'-bis(alkylthioglycollate) per 10 mls. solution.

When this quantitative method was used in the following examples, 1.000 g. samples of the dialkyltin S,S'-bis-(alkylthioglycollates) were weighed into a 10 ml. volumetric flask and diluted to volume with 1,2-dichloroethane (spectral grade). The 5–7 micron infrared spectrum was determined and quantitation of the dialkyltin mercaptoacetate impurity absorbance at 6.4 microns was determined. The level of impurity was determined by using the formulas to calculate the percent impurity in the sample.

In order to improve upon the accuracy of the quantitative analysis of the dibutyltin mercaptoacetate impurity at low absorbance levels by infrared analysis, a technique known as Expanded Scale Readout was employed. This technique enables one to determine the absorbance of minor infrared peaks more accurately. The pen drive voltage of the Model 337 Perkin-Elmer Infrared Spectrophotometer was fed to an expanded scale readout kit #220–0058 (Perkin-Elmer). The voltage output of the expanded scale readout kit was fed to an external multi-volt recorder (Sargent MR Recorder). The settings were such that 70–100% transmission was recorded on the 10" (250 division) chart paper of the external recorder. Differences of 0.12% transmission (1/250×30%) were easily determined. The baseline transmission was taken at the maximum absorbance of a minor peak at about 5.35 microns which varied only from 94.25% T. to 94.45% for all examples. Impurity transmission (T) was determined at about 6.4 microns using the same concentrations, cells, etc., as described above. Absorbances (A) were then calculated from the standard infrared equation log $1/T = A$. The impurity level was determined by the linear equation developed in Table I.

EXAMPLE 1

Preparation of dibutyltin S,S'-bis(iso-octylthioglycollate) by continuous method A laboratory glass continuous reactor was set up by mounting a glass reactor tube having a length of about 15" and an internal diameter of 1½" on a stand at an angle of approximately 30°. Both ends of the reactor were open to the atmosphere. Electrical heating wire was wound around the exterior of the tubular reactor over a length of about 12" between the ends of the reactor and this wire was then insulated. Situated near the open upper end of the tubular reactor was a dropping funnel flask having a stopcock. A laboratory motorized stirrer was situated above the funnel flask for stirring the contents. A feed adaptor was furnished between the outlet of the dropping funnel and the open inlet end of the tubular reactor. Adjacent to the lower lip end of the tubular reactor was situated an outlet thermometer for recording the exit temperature of the product. The thermometer was situated over a beaker receiver into which the product was collected after flowing over the thermometer. Just inside the inlet upper end of the reactor, an inlet thermometer was rested on the inside lower reactor surface and was read as the reaction zone temperature. The temperature of the heated zone of the tubular reactor was controlled by a voltage regulator.

A mixture of 62.25 grams dibutyltin oxide and 105.34 grams iso-octylmercaptoacetate (in about molar ratios of 1:2) was slurried in the dropping funnel flask and the slurry maintained by stirring during the following run. The tubular reactor was then heated electrically by means of the voltage regulator until the temperature recorded by the inlet thermometer was 150° C. The slurry from the dropping funnel was then fed to the reactor through the stopcock and feed adapter into the reactor inlet. The reaction mixture was heated in the reactor and the desired product flowed from the reactor outlet over the outlet thermometer. The water from the reaction was changed to steam which was passed out through the reactor inlet end into the atmosphere.

The addition rate of the reaction mixture was controlled by the dropping funnel stopcock. The flow rate was controlled by the angle of incline of the reactor. With this type reactor apparatus, flow rates could be controlled from about one to seven or more milliliters per minute. The desired steady state flow rate conditions of operation employed for this example were 4 ml. per minute with a product exit temperature of about 120° C. The resulting product appeared to have a very slight insoluble haze which was removed by hot filtration. This haze was not attributable to any reaction product, but rather impurities, i.e., sodium chloride, in the dibutyltin oxide reactant. This filtration procedure was used for the batch reaction following this example to maintain this constant identity between both processes. The final product was characterized by conventional capillary film infrared analysis, above described, to be dibutyltin S,S'-bis(iso-octylthioglycolllate) having only trace amounts of dialkyltin mercaptoacetate impurity at 6.4 microns. The product had a refractive index of 1.5058 at 25° C.

Quantitative infrared analysis, for the impurity indicated an amount of about 0.0582% by weight. This was determined according to the calculations above described and the Expanded Scale Readout technique.

| IR curve | Percent T | Absorbance | Percent impurity |
|---|---|---|---|
| Base | 94.35 | 0.0252 | |
| Peak | 93.63 | 0.0285 | |
| Δ | | 0.0033 | 0.058 |

No crystallization occurred in this condensation product even upon standing at room temperature after 500 days. This storage stability or shelf life of samples of the dibutyltin S,S'-bis(iso-octylthioglycollate) condensation product was determined by sample storage in a sealed glass container at normal laboratory room temperature conditions. The flash point of dibutyltin S,S'-bis(iso-octylthioglycollate) product prepared by the method of Example 1 was about 425° F. as determined by the Cleveland Open-Cup Method (ASTM D92–66).

EXAMPLE 2

Conventional batch preparation of dibutyltin S,S'-bis(iso-octylthioglycollate)

A mixture of 93.37 grams dibutyltin oxide and 158.0 grams iso-octylmercaptoacetate were added to 60 ml. toluene in a 500 ml. round bottom 3-neck flask fitted with a stirrer, thermometer, Dean-Stark trap fitted for water azeotrope takeoff, and an electric heating jacket. The reaction mixture was heated rapidly to the distillation temperature of the toluene/water azeotrope. The azeotrope was removed rapidly followed by the balance of the toluene by heating to 123° C. for 15 minutes. Vacuum was then applied and the balance of the toluene was stripped in 15 minutes. The insoluble haze was filtered from the hot reaction product for the reason mentioned in Example 1. The resulting filtrate was characterized by the above described conventional capillary film infrared analysis to be dibutyltin S,S'-bis(iso-octylthioglycollate) showing 1–2% dibutyltin mercaptoacetate impurity absorption at 6.4 microns and having a refractive index of 1.5055 at 25° C. Quantitative infrared analysis by the above described method for undesired dibutyltin mercaptoacetate impurity indicated an amount of 1.88%.

| IR curve | Percent T | Absorbance | Percent impurity |
|---|---|---|---|
| Base | 94.35 | 0.0252 | |
| Peak | 79.96 | 0.0972 | |
| Δ | | 0.0720 | 1.88 |

Crystallization of the impurity occurred after one day at room temperature when stored under the identical conditions of Example 1. Upon filtration of the liquid layer from the crystalline material, the filtrate was quantitated to contain about 0.18% by weight impurity to demonstrate the saturation point of the impurity therein.

The flash point of the condensation product produced by the method of this Example 2 was 340° F. according to the mentioned ASTM D92–66 method. Therefore, in comparison, the dibutyltin S,S'-bis(iso-octylthioglycollate) of this invention is characterized as a storage stable liquid substantially free of dibutyltin mercaptoacetate impurity (i.e., about 0.06% or less than 0.075%; well below the saturation point of impurity) and has a flash point of about 425° F. Moreover, the product of Example 1 according to this invention, was homogeneous liquid, devoid of crystalline material. The product of Example 1 when compared property-wise to the conventional product of Example 2 was vastly superior in essential properties of storage stability, homogeneity, flash point and lack of dibutyltin mercaptoacetate impurity.

EXAMPLE 3

Preparation of dioctyltin S,S'-bis(iso-octylthioglycollate) by continuous method In a manner similar to Example 1 and employing the apparatus therein described, a mixture of 208.5 grams iso-octylmercaptoacetate and 180.4 grams di-n-octyltin oxide was slurried and fed to the continuous reactor. The steady state flow rate was held at about 5 ml. per minute with an exit stream temperature of 140° C. The insoluble haze was filtered from the hot product as in Example 1 and the resulting product characterized by the mentioned conventional capillary film infrared analysis to be di-n-octyltin S,S'-bis(iso-octylthioglycollate) with a very low level of dioctyltin mercaptoacetate impurity absorption at 6.4 microns qualitatively observed. Quantitative infrared analysis for the impurity, conducted in the manner above described, indicated an impurity level of 0.16% by weight. The flash point of condensation product prepared by the method according to this example was 395° F. by the ASTM D92–66 method.

The toxicity of this di-n-octyltin bis(iso-octylthioglycollate) was compared to that of dioctyltin mercaptoacetate impurity as prepared in Example 11 hereinafter. An oral $LD_{50}$ toxicology study on random bred male Swiss mice was performed to estimate lethal dosage of these two derivatives. An $LD_{50}$ value of 756.8 mgm./kg. was obtained for the di-n-octyltin bis(octylthioglycollate) in contrast to an $LD_{50}$ value of 330 mgm./kg. for the dioctyltin mercaptoacetate impurity. Therefore, the impurity was found to be about 2.3 times as toxic as the pure condensation product. This demonstrates the importance of this invention in obtaining the lowest level possible for the diorganotin impurity in the desired condensation product since these stabilizers when used in plastic bottles and film applications for food packaging usage must meet rigid standards of non-toxicity in order to have utility in these areas.

EXAMPLE 4

Conventional batch preparation of di-n-octyltin S,S'-bis(iso-octylthioglycollate)

In a manner similar to Example 2, 135.5 grams di-octyltin oxide, 157.5 grams iso-octylmercaptoacetate and 60 ml. toluene were heated rapidly to remove the water of reaction by azeotropic distillation followed by a brief vacuum distillation to strip the balance of the toluene. The resulting product was filtered hot in the same manner as provided in previous examples for the same purpose. The filtrate was qualitatively characterized by the discussed conventional capillary film infrared technique to be di-n-octyltin S,S' - bis(iso - octylthioglycollate) with large (about 2%) dioctyltin mercaptoacetate absorption at 6.4 microns. Quantitative infrared analysis for undesired impurity indicated a level of 1.93% by weight. The flash point of this condensation product was about 325° F.

Accordingly, in comparison to the product of Example 4, the dioctyltin S,S'-bis(iso-octylthioglycollate) of this invention in Example 3 is characterized as a homogeneous storage stable liquid substantially free of dioctyltin mercaptoacetate impurity (i.e., about 0.16% or less than about 0.2%) and has a flash point of about 395° F. The level of the relatively more toxic impurity is reduced from about 2% to less than 0.2% when the product of this invention is compared to the conventional product of Example 4.

EXAMPLE 5

Continuous preparation of dibutyltin S,S'-bis(iso-octylthioglycollate) on a commercial vacuum thin-film processor A commercial vacuum, thin-film processor was employed as the heat exchange zone in this example, identified as the Kontro Reverse Taper Thin-Film Processor (Pilot Plant Model) having 1 sq. ft. of heat transfer area and manufactured by The Kontro Company, Inc., Petersham, Mass. This apparatus is of the type fully described in U.S. Pat. 2,927,634 and the drawings and description thereof are incorporated herein by reference. Briefly, this apparatus is a horizontal tubular reactor (of the type shown in FIG. 3 of the patent) having a steam heating jacket and an internal rotor with blades axially mounted at both ends of the reactor. The rotor was driven by a 1 to 3 horsepower motor. The overall dimensions of the tubular reactor are 4 feet in length x 1 foot outside diameter with 1 sq. ft., as mentioned, for internal heat transfer area. The capacity for evaporation of water per hour at 27″ of vacuum and 30 pounds of steam pressure was about 60 pounds of water. This unit had a reaction mixture inlet port, a bottom product exit port and a water vapor outlet port similar to that shown in the mentioned patent.

A mixture of 43.90 lbs. of dibutyltin oxide and 74.14 lbs. of iso-octylmercaptoacetate were slurried in a 40 gallon feed tank. The slurry was fed to the reactor and samples taken at various steady state operating conditions as outlined in Table V as follows. The flow rate and temperature conditions for this example demonstrate that about 70 pounds of reaction mixture per hour is passed through the heat exchange zone per 1 square foot of heat transfer area at about 120–135° C. This flow rate-temperature control data, of course, can be applied to the preparation of other products of this invention within the skill of the art.

TABLE V

| Conditions | Samples | | | |
|---|---|---|---|---|
| | 1 | 2 | 3 | 4 |
| Temperatures, °C.: | | | | |
| Exit product | 120 | 121 | 132 | 131 |
| Vapor | 100 | 101 | 113 | 114 |
| Steam | 123 | 123 | 133 | 134 |
| Pressure: | | | | |
| Unit/in. Hg (vacuum) | 28 | 28 | 28 | 28 |
| Steam/p.s.i. | 16 | 16 | 29 | 29 |
| Feed rate, lbs./hr | 69.8 | 69.8 | 69 | 69 |

Table VI summarizes the product analysis of the samples for dibutyltin mercaptoacetate impurity as follows by the mentioned conventional capillary film technique:

TABLE VI

| | Samples | | | |
|---|---|---|---|---|
| | 1 | 2 | 3 | 4 |
| Percent impurity | Nil | Nil | Nil | Nil |
| Refractive index at 25° C | 1.5054 | 1.5061 | 1.5064 | 1.5064 |

The samples were assayed by the quantitative infrared technique to contain 0.071% dibutyltin mercaptoacetate impurity and they had a room temperature shelf life of greater than 440 days.

EXAMPLE 6

Preparation of dibutyltin S,S'-bis(dodecylthioglycollate) by continuous method

In a manner similar to Example 1 and employing the same apparatus mentioned therein, a mixture of 62.25 grams dibutyltin oxide and 132.98 grams of dodecylmercaptoacetate was slurried and fed to the continuous reactor. The flow rate was 10 ml./min. and the reaction mixture was passed twice through the reactor at 110–125° C. The resulting product was filtered with 2% filter aid (dicalite) and the filtrate characterized as the desired product, showing a marked absence of impurity by the capillary film infrared spectroscopy method. Product Refractive Index 1.4969 at 25° C.

EXAMPLE 7

Conventional batch preparation of dibutyltin S,S'-bis(dodecylthioglycollate)

A mixture of 93.37 grams dibutyltin oxide, 199.46 grams dodecylmercaptoacetate and 60 ml. toluene was added to a 500 ml. round-bottom flask fitted with a stirrer, thermometer and a Dean-Stark trap fitted with a reflux condenser, and an electric heating mantle. The reaction mixture was stirred and heated rapidly to reflux. The water of reaction was removed by azeotropic distillation. Total heat time at atmospheric pressure was about 30 minutes. At a temperature of 125° C. vacuum was applied and the remaining toluene was stripped in 15 minutes. The resulting product was filtered with 2% filter aid(dicalite) and the filtrate characterized as the desired product showing an obvious presence of impurity by the capillary infrared spectroscopy method. Refractive Index 1.4970 at 25° C.

EXAMPLE 8

Preparation of dibutyltin S,S'-bis(ethylthioglycollate) by continuous method

In a manner similar to Example 1 and employing the same apparatus, a mixture of 62.25 grams dibutyltin oxide and 61.54 grams ethylmercaptoacetate were slurried and fed to the continuous reactor. The flow rate was 4.5 ml. per minute with product exit temperature of about 115° C. The resulting product was filtered as above and characterized as the desired product containing about 2% dibutyltin mercaptoacetate impurity by capillary infrared spectroscopy. Refractive Index 1.4968 at 25° C.

EXAMPLE 9

The batch preparation of dibutyltin S,S'-bis-(ethylthioglycollate)

In a manner similar to Example 7, 93.37 grams dibutyltin oxide, 92.3 grams ethylmercaptoacetate and 60 ml. of toluene were placed in the laboratory reactor and heated slowly to 84° C. The water was removed by azeotropic distillation in 25 minutes. Vacuum was applied and the toluene stripped off for 20 minutes. At this point, the temperature was 35° C. and the light yellow liquid began to boil vigorously and turn dark. The vacuum was released. An exotherm to 39° C. was observed. A dark reddish brown liquid resulted which crystallized on standing. Resulting product did not appear to be desired product by infrared analysis, and principally contained dibutyltin mercaptoacetate.

Comparative Examples 8 and 9 demonstrate the unexpected and unique advantages of the process of this invention over the prior art batch type process. This invention, as shown by Example 8, provides a method of preparing diorganotin bis(ethylthioglycollate) and like derivatives in a relatively pure state. In contrast, the prior art batch technique of Example 9 is totally unsatisfactory and the product produced was principally the dibutyltin mercaptoacetate impurity.

EXAMPLE 10

The isolation of impurity by-product dibutyltin mercaptoacetate from dibutyltin S,S'-bis(iso-octylthioglycollate)

The crystalline material from a conventional batch type preparation of dibutyltin S,S'-bis(iso-octylthiogylcollate), Example 2, was isolated after crystallization occurred at room temperature. The dibutyltin S,S'-bis(iso-octylthioglycollate) was decanted from the crystals. The crystals were slurried with petroleum ether, filtered and washed well with petroleum ether. The crystals were allowed to dry at room temperature. The resulting crystals were characterized as dibutyltin mercaptoacetate by infrared spectroscopy and had a melting point of 156° C. and a neutralization equivalent of 325 (ethanol),

13 theoretical being 323.02. As discussed above, this product was employed in the infrared analytical techniques.

EXAMPLE 11

The preparation of dioctyltin mercaptoacetate

A mixture of 90.5 grams dioctyltin oxide and 24.2 grams thioglycolic acid were slurried in 400 ml. chloroform. After 1¼ hours, the slurry had changed to a solution and exotherm and had been observed. Slight haze was filtered and the filtrate was stripped with vacuum and heat. Resulting product was a thick viscous fluid having an infrared spectrum characteristic of dioctyltin mercaptoacetate. The neutralization equivalent was 444 (theory 435.23) in 50/50 chloroform/isopropanol solution. This product was employed in the analytical infrared technique as described above.

Having described the principles of this invention and given numerous embodiments thereof, it will become apparent to those of ordinary skill in this art that other embodiments are obvious in view of this description and, accordingly, applicant should not be limited to the specific examples with which the invention is particularly exemplified.

Also, having described this invention, in overcoming the problems particularly unique to the production of $R_2Sn(SCH_2COO.R')_2$ derivatives and the elimination of diorgano mercaptoacetate impurities, it will be understood in view of this disclosure, that advantages of this invention are applicable to the production of other organotin mercaptocarboxylic acid esters, organotin mercaptides, organotin carboxylates, stannoic acids, exemplified by dibutyltin dithiopropionic acid esters, dibutyltin dilaurylmercaptide, dibutyltin dilaurate, butyltin 2-ethylhexyl maleates and butyl stannoic acid.

Further, the utility of the products of this invention and the method by which they are prepared has been fully covered. When the diorganotin S,S'-bis(thioglycollate ester) is employed as a stabilization additive in vinyl halide resins, it is typically incorporated in the vinyl halide resin in minor amounts on the order of about 0.02 to 10 parts by weight per 100 parts by weight of vinyl halide resin, sometimes along with conventional plasticizers and other additives. Specific examples of its utilization for this purpose are embodied in the patents mentioned in the background of this invention and for purposes of utility, those types of formulations are embodied herein by reference.

What is claimed is:

1. A method of producing a diorganotin S,S'-bis (thioglycollate ester) comprising,
    providing a heat exchange zone for the continuous passage of a reaction mixture,
    continuously passing the reaction mixture of diorganotin oxide and a thioglycollic acid ester through said zone and
    collecting diorganotin S,S'-bis (thioglycollate ester) after said passage.

2. The method according to claim 1 comprising the further steps of subjecting the reaction mixture to a temperature in said zone sufficient to evaporate by-product water from said reaction mixture and removing the vaporous by-product water from said zone whereby the diorganotin S,S'-bis (thioglycollate ester) is collected substantially free from by-product water.

3. The method according to claim 2 wherein said evaporation occurs with the use of vacuum.

4. A method of producing a diorganotin S,S'-bis(thioglycollate ester) represented by the formula $$R_2Sn(SCH_2COO.R')_2$$

14 wherein R and R' represent monovalent hydrocarbon radicals comprising,
    providing a heat exchange zone for the continuous passage of a reaction mixture therethrough,
    continuously passing through said zone the reaction mixture of a diorganotin compound having the formula $R_2SnO$ and a thioglycollic acid ester having the formula $HSCH_2COO.R'$ wherein both R and R' are monovalent hydrocarbon radicals, and
    collecting the diorgano S,S'-bis(thioglycollate ester) after said passage.

5. The method according to claim 4 wherein said reaction mixture passage occurs at a rate and at a temperature sufficient to produce the diorganotin S,S'-bis (thioglycollate ester) substantially free of diorganomercaptoacetate impurity.

6. The method according to claim 4 wherein said reaction mixture is subjected to a temperature in said zone sufficient to evaporate by-product water from the reaction mixture and removing the vaporous by-product water prior to collecting the diorganotin S,S'-bis (thioglycollate ester).

7. The method according to claim 4 wherein the R radical is alkyl containing about 4 to about 8 carbon atoms inclusive, and the R' radical is alkyl containing about 2 to 22 carbon atoms inclusive.

8. Homogeneous organotin mercaptoacid ester condensation products having unlimited room temperature storage stability represented by the formula $$R_2Sn(SCH_2COO.R')_2$$

wherein the R radical is alkyl containing about 4 to 8 carbon atoms inclusive and the R' radical is alkyl containing about 2 to 22 carbon atoms inclusive, substantially free from dialkyltin mercaptoacetate, alkanol and alkylmercaptoacetate.

9. As a composition of matter, dibutyltin S,S'-bis (iso-octylthioglycollate) characterized as a storage stable homogeneous liquid substantially free from dibutyltin mercaptoacetate impurity and having a flash point greater than about 380° F.

10. As a composition of matter, dioctyltin S,S'-bis (iso-octylthioglycollate) characterized as a storage stable homogeneous liquid substantially free from dioctyltin mercaptoacetate impurity and having a flash point greater than about 360° F.

11. The composition of claim 9 containing less than about 0.075% by weight of said impurity.

12. The composition of claim 10 containing less than about 0.20% by weight of said impurity.

13. As a composition of matter, substantially pure dibutyltin S,S'-bis (ethylthioglycollate).

14. The method according to claim 7 wherein the diorganotin compound is selected from the group consisting of dibutyltin oxide and dioctyltin oxide and wherein the thioglycollic acid ester is selected from the group consisting of iso-octylmercaptoacetate, dodecylmercaptoacetate and ethylmercaptoacetate.

References Cited

UNITED STATES PATENTS

| | | | |
|---|---|---|---|
| 2,789,102 | 4/1957 | Weinberg | 260—429.7 |
| 2,832,751 | 4/1958 | Weinberg et al. | 260—429.7 |

DANIEL E. WYMAN, Primary Examiner

W. F. W. BELLAMY, Assistant Examiner

U.S. Cl. X.R.

260—45.75 K